United States Patent [19]

Iura et al.

[11] Patent Number: 5,617,312
[45] Date of Patent: Apr. 1, 1997

[54] COMPUTER SYSTEM THAT ENTERS CONTROL INFORMATION BY MEANS OF VIDEO CAMERA

[75] Inventors: Noriyuki Iura, Yokohama; Yoshimichi Kudo, Fujisawa; Kenji Ichige, Chigasaki; Naoki Yamamoto, Yokohama; Takuya Imaide, Fujisawa, all of Japan

[73] Assignee: Hitachi, Ltd., Tokyo, Japan

[21] Appl. No.: 343,962

[22] Filed: Nov. 18, 1994

[30] Foreign Application Priority Data

Nov. 19, 1993 [JP] Japan .................................. 5-290699

[51] Int. Cl.$^6$ .................................................. G06F 3/00
[52] U.S. Cl. ........................ 364/188; 345/157; 382/291; 358/453
[58] Field of Search .......................... 345/156–158; 364/188–190, 148, 516, 559; 382/291; 358/453

[56] References Cited

U.S. PATENT DOCUMENTS

| | | | |
|---|---|---|---|
| 4,891,630 | 1/1990 | Friedman et al. | 345/156 |
| 5,168,531 | 12/1992 | Sigel | 382/291 |
| 5,227,985 | 7/1993 | DeMenthon | 364/559 |
| 5,297,061 | 3/1994 | DeMenthon et al. | 364/559 |
| 5,347,371 | 9/1994 | Nishimura et al. | 358/453 |
| 5,367,315 | 11/1994 | Pan | 345/156 |
| 5,388,059 | 2/1995 | DeMenthon | 364/559 |

FOREIGN PATENT DOCUMENTS

| | | | |
|---|---|---|---|
| 3-17696 | 1/1991 | Japan | 345/158 |
| 5-183811 | 7/1993 | Japan . | |

OTHER PUBLICATIONS

Raab et al., "Magnetic Position and Orientation Tracking System," IEEE Traus on Aerospace and Electronic System, vol. AES–15, No. 5 Sep., 1979, pp. 709–718.
Lopiccola, "Meet the Mouse," Popular Computing 2 (5) Mar., 1983, pp. 102–105.
Magnetic Position and Oriewtation Tracking System, IEEE Traus on Aerospace and Electronic System, AES–15, No. 5, Sep. 1979, pp. 709–718.
Furukawa, et al., Science of Interface, Kyoritsu Shuppan (Apr. 1, 1987) pp. 115–116.
Ben Shneidereman, Design of User Interface, Nikkei BP (Aug. 30, 1993) pp. 171–179.
Iwata et al., Virtual Reality Generating Technology and application, Schiece, sha. (Dec. 25, 1992) pp. 8–11.

*Primary Examiner*—Roy N. Envall, Jr.
*Assistant Examiner*—Steven R. Garland
*Attorney, Agent, or Firm*—Antonelli, Terry, Stout & Kraus, LLP

[57] ABSTRACT

A computer system replaces an input device, such as a mouse, with a video camera having an image recognizing function and an image extracting function to detect motions of the operator's body directly, and controls a computer apparatus to move a cursor and check on an icon on the basis of the output signals of the video camera. The computer system controls the computer apparatus also on the basis of a signal provided by the video camera upon the detection of light emitted by a particular object. The computer system is capable of making the computer apparatus understand an operator's intention without using any conventional input device, such as a mouse, and of facilitating an operator's input operation.

4 Claims, 9 Drawing Sheets

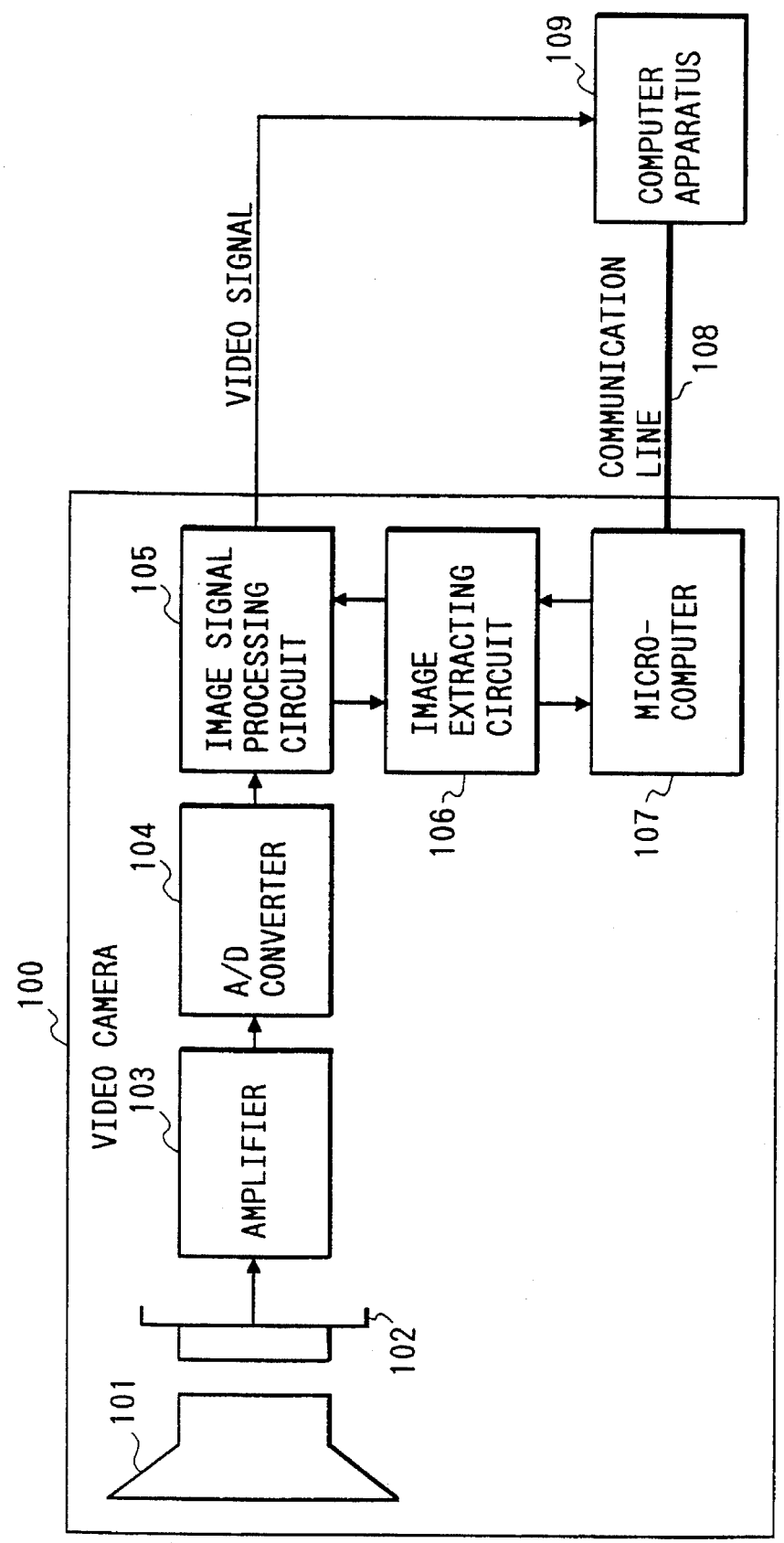

COMPUTER SYSTEM THAT ENTERS CONTROL INFORMATION BY MEANS OF VIDEO CAMERA

BACKGROUND OF THE INVENTION

The present invention relates to an input system for a computer and, more particularly, to a computer system which is capable of providing a satisfactory interface for effecting intercommunication between a computer apparatus and an operator of that apparatus.

A mouse, a keyboard, a track ball and a joystick are input devices serving as an interface between an operator, and a personal computer (hereinafter abbreviated to "PC"), a work station (hereinafter abbreviated to "WS"), a computer game machine or the like. In recent years a mouse has been most commonly used input means for entering information into a PC or a WS.

When operating a PC or a WS with a mouse, an icon is clicked on by operating the mouse. An icon is a pictorial representation of a process or an instruction in the form of characters and symbols displayed on a display screen. The term "click" means specifying desired information by pushing a predetermined button on a mouse. When clicking on a desired icon, the operator moves the mouse a flat surface, such as the top surface of a desk, to move a cursor displayed on the screen of a display device to a position corresponding to the desired icon. The mouse separates the displacement into a vertical displacement and a horizontal displacement and gives signals representing the vertical displacement and the horizontal displacement to the PC or the WS. The position of the cursor on the screen changes according to the vertical and the horizontal displacement provided by the mouse.

A conventional input system employing an input device, such as a mouse, is not a perfect input system for the following reasons.

(1) Use of an input device, such as a mouse, is not ideal for making the computer apparatus recognize the operator's intention; that is, the operator's intention is transmitted indirectly through the input device, such as a mouse. Therefore, it may be safely said that the conventional input system is not a perfect man-machine interface.

(2) A space sufficient to move a mouse must be available on the desk for operating a computer apparatus, however, in most cases, papers and documents necessary during operation of the computer apparatus are spread on the desk. Therefore, the operator needs to find a space sufficient to use the mouse somewhere on the desk in an area other than that occupied by the papers and documents.

On the other hand, various PCs and WSs having an image input function have come onto the market in recent years, and some of those are provided with a video camera. It is expected that the relation between computer apparatuses, such as PCs and WSs, and video cameras will become clear. However, currently, computer apparatuses, such as PCs and WSs, merely use the output image signals of a video camera simply as image data.

SUMMARY OF THE INVENTION

The present invention has been made in view of the present state of conventional in the computer field, and it is therefore an object of the present invention to provide an easy-to-use input system capable of directly making a computer apparatus recognize an operator's intention by using a video camera without requiring the operation of an input device, such as a mouse, which has been generally used heretofore for operating a computer apparatus, namely, without requiring the manual operation of an input tool.

An input system using images in accordance with the present invention employs a video camera capable of generating and supplying image data. The video camera determines the position of a subject, such as an operator's hand, a particular object held in the operator's hand or a portion of the operator's body, through image extraction techniques, and gives information about the position of the subject to a computer apparatus.

Such an information input operation using a video camera, in contrast to a conventional information input operation using an input device, such as a mouse, does not need the manual operation of an input tool and is virtually able to make the computer apparatus recognize the operator's intention directly.

BRIEF DESCRIPTION OF THE INVENTION

The present invention will become more apparent from the following detailed description, when taken in conjunction with the accompanying drawings, in which:

FIG. 1 is a block diagram of a computer system forming a first embodiment according to the present invention;

Figure 6:
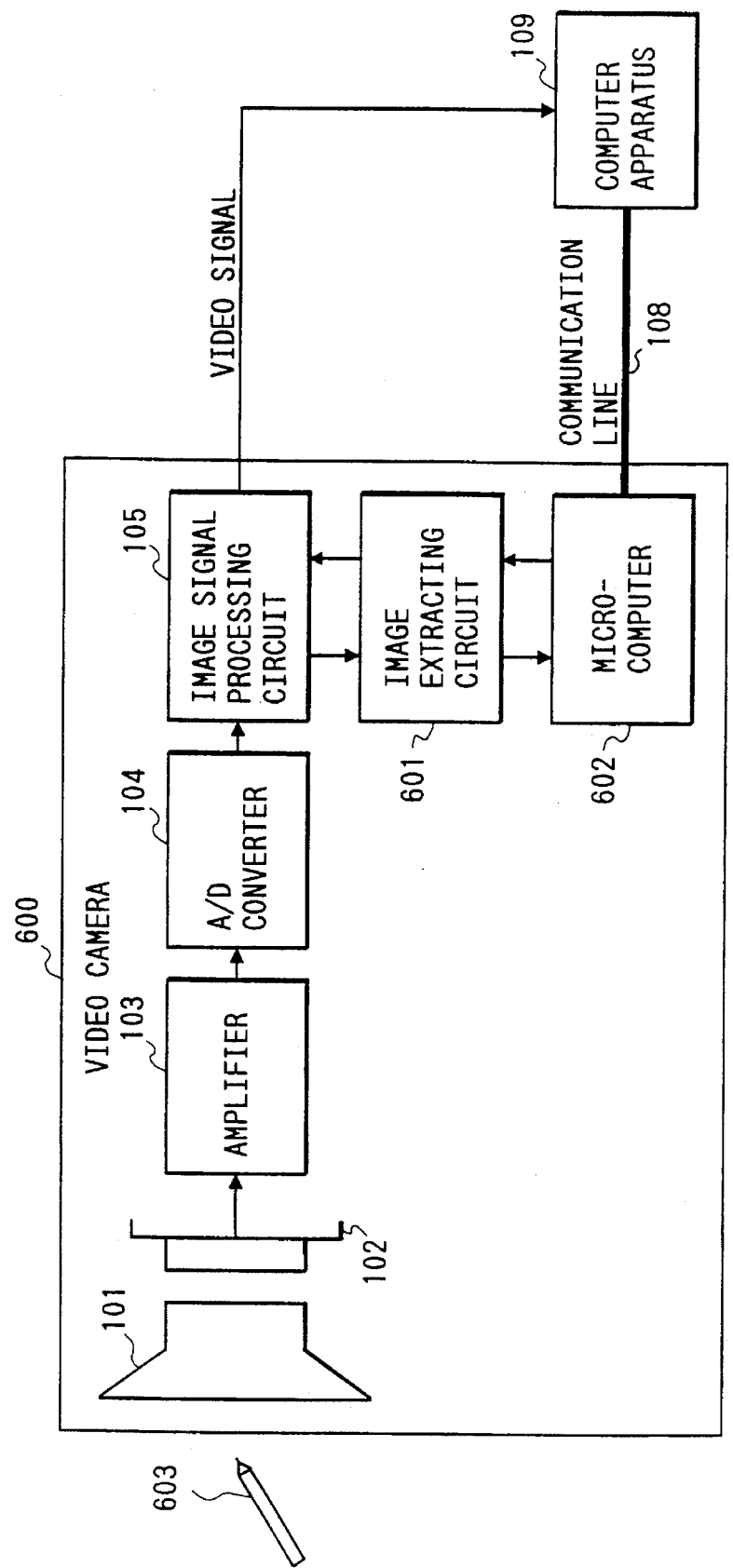
FIG. 6 is a block diagram of a computer system forming a second embodiment according to the present invention.
Figure 9A:
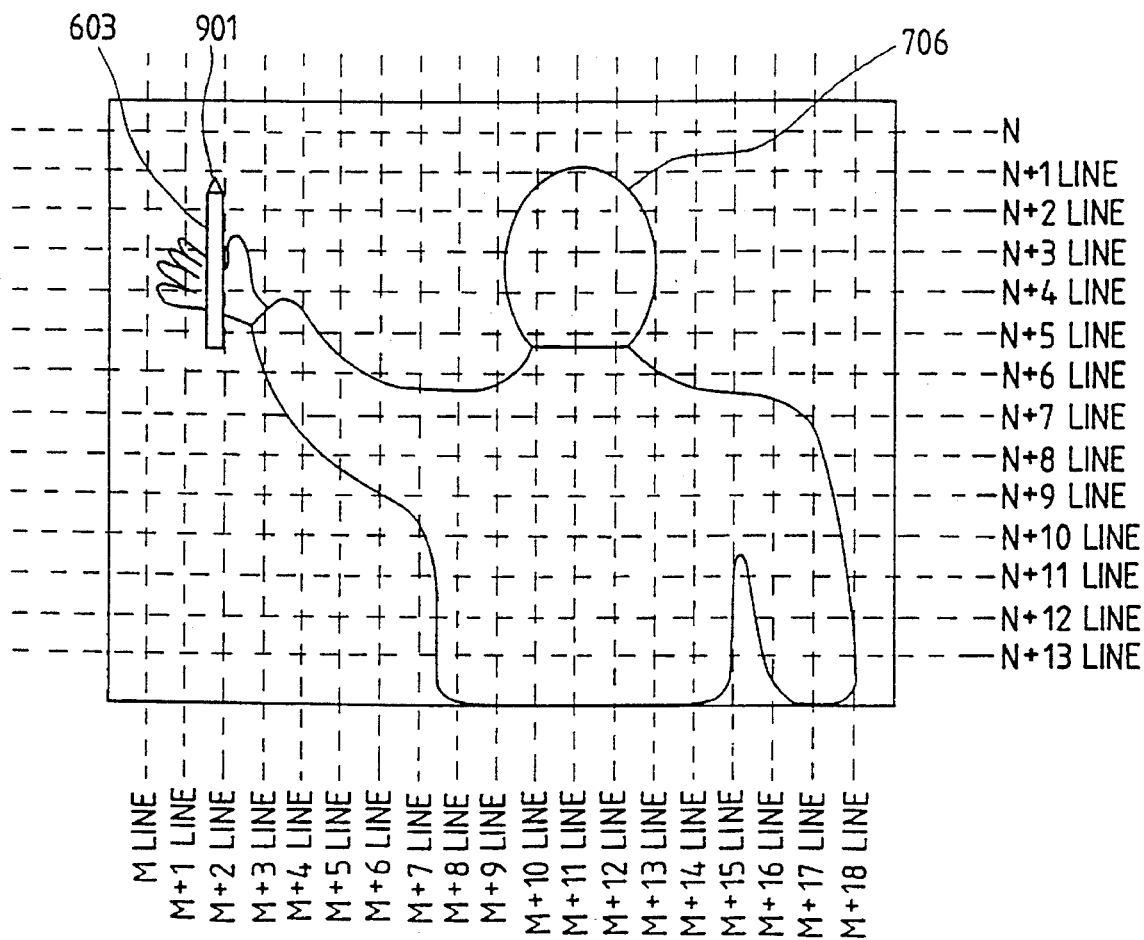
Figure 9B:
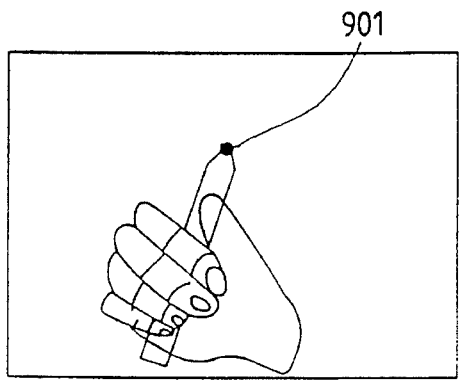
Figure 10:
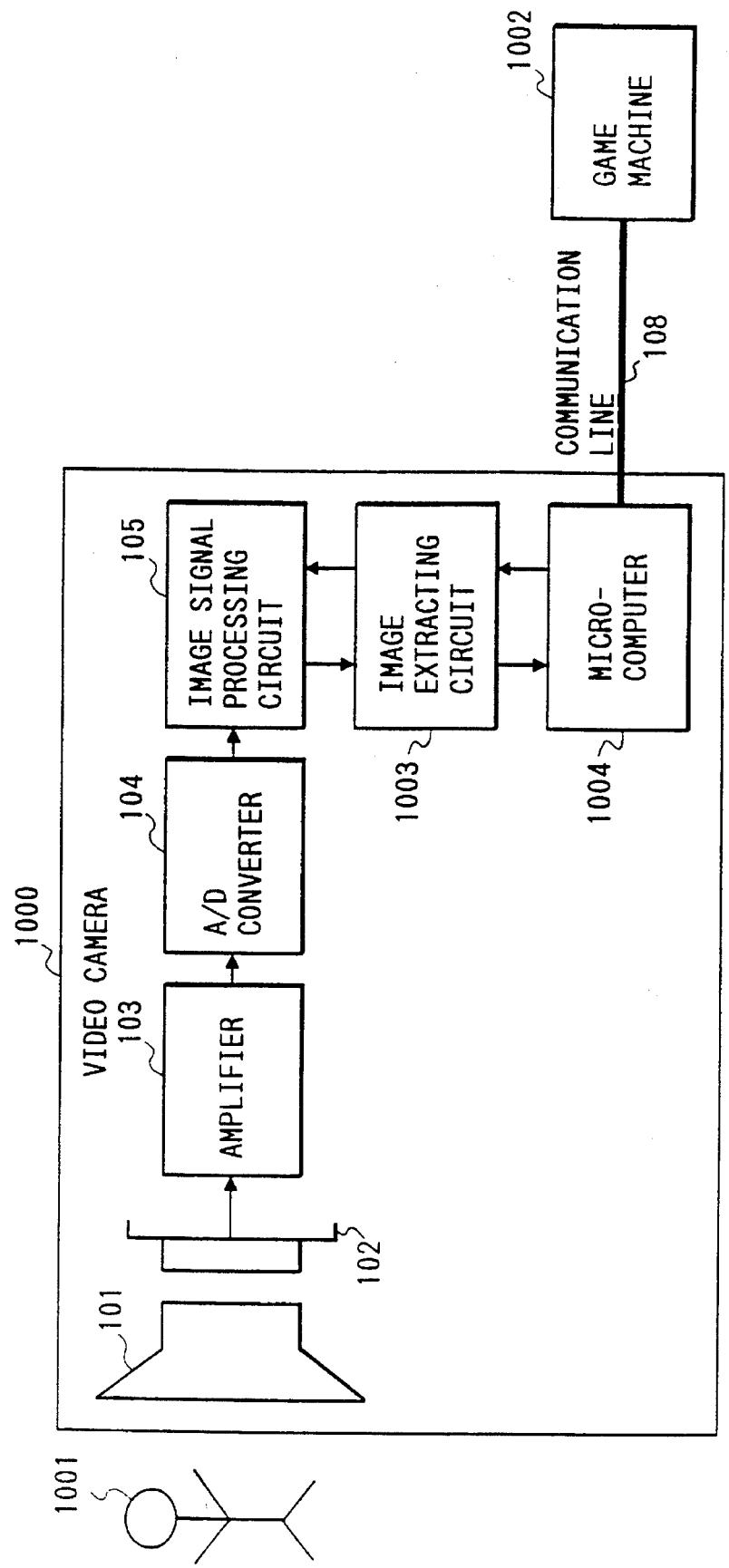
Figure 11:
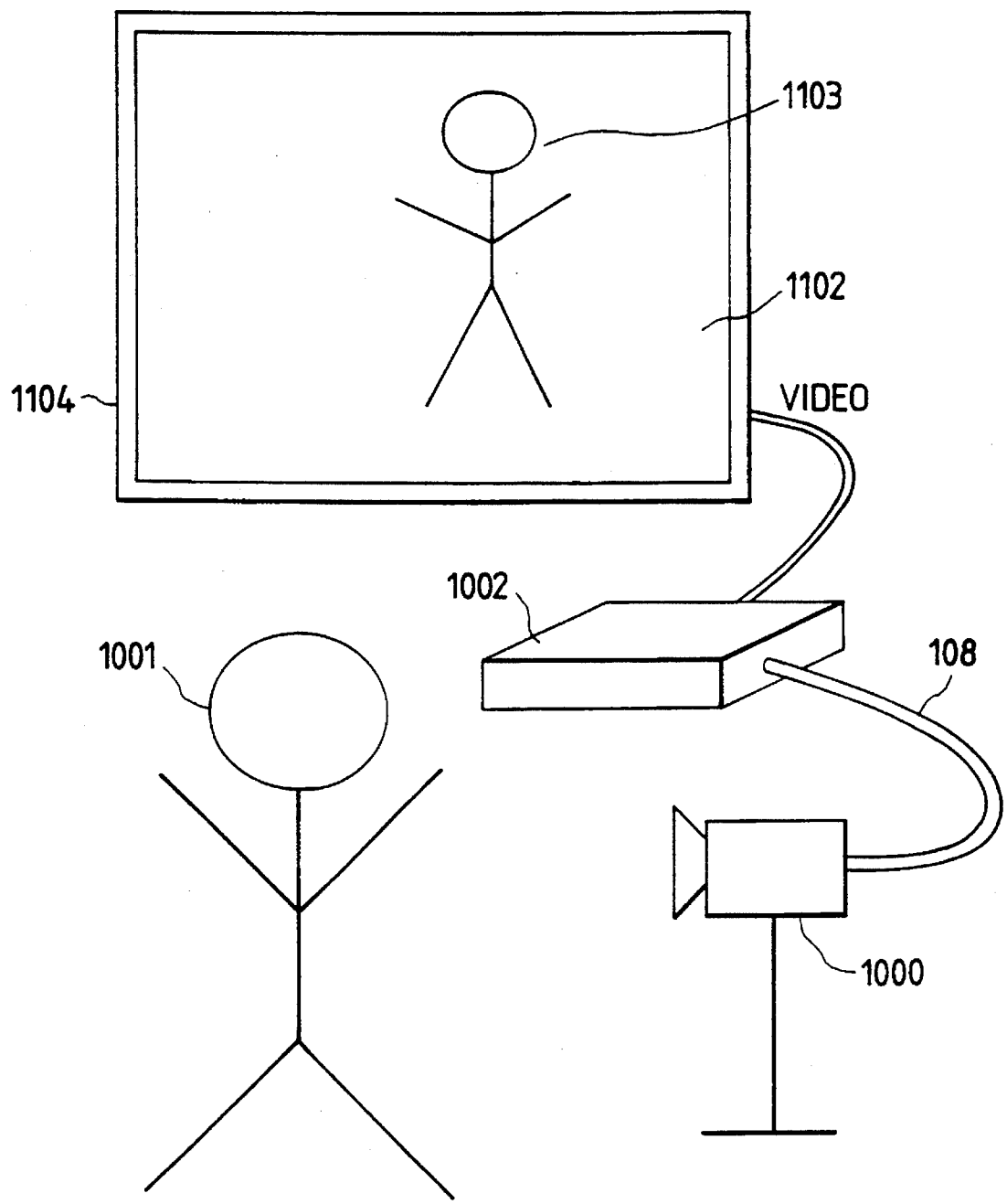
Figure 12:
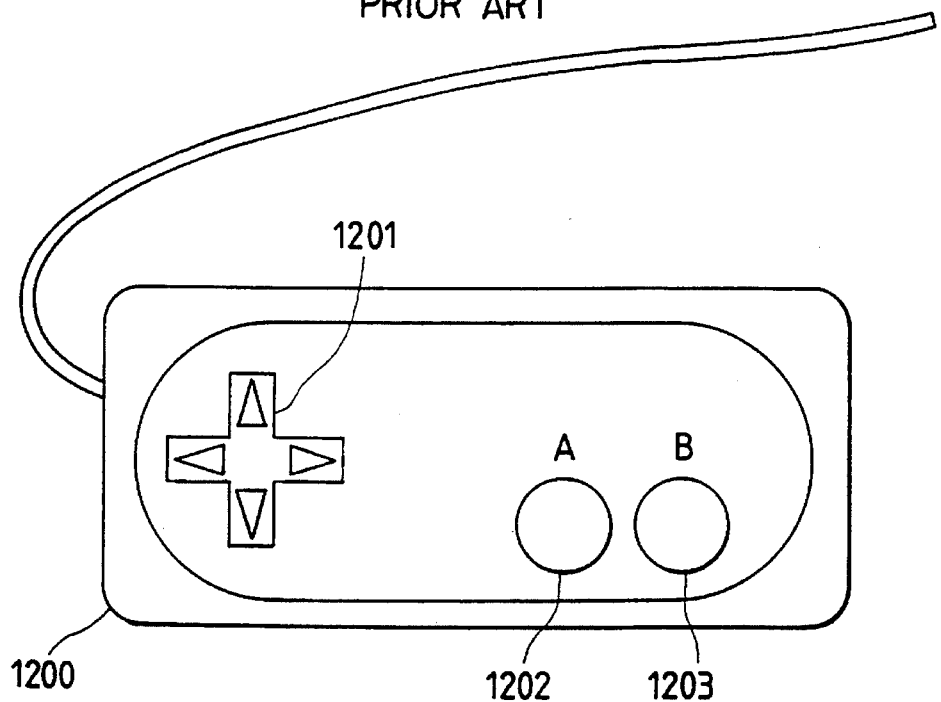
Figure 13:
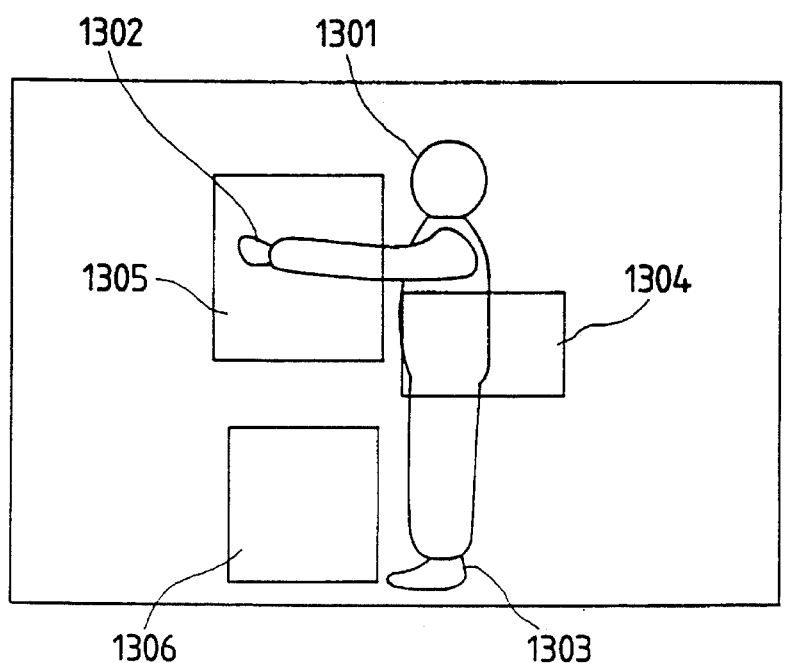

FIGS. 9(a) and 9(b) are diagrammatic views of a picture in an example formed by the computer system of FIG. 6;

FIG. 10 is a block diagram of a computer system forming a third embodiment according to the present invention;

FIG. 11 is a diagrammatic view of the component devices of the computer system of FIG. 10 and an operator's operating action;

FIG. 12 is a front view of a controller in an example of a device for entering instructions into a conventional computer game machine; and FIG. 13 is a diagrammatic view of a picture formed by the computer system of FIG. 10.

DETAILED DESCRIPTION OF THE PREFERRED EMBODIMENTS

Preferred embodiments of the present invention will be described hereinafter with reference to the accompanying drawings.

Referring to FIG. 1, a video camera 100 comprises a lens 101, an imaging device 102, an amplifier 103, an A/D converter 104, an image signal processing circuit 105, an image extracting circuit 106 and a microcomputer 107. The microcomputer 107 in the video camera 100 is connected to a computer apparatus 109, such as a PC or a WS, by a communication line 108.

Figure 2:
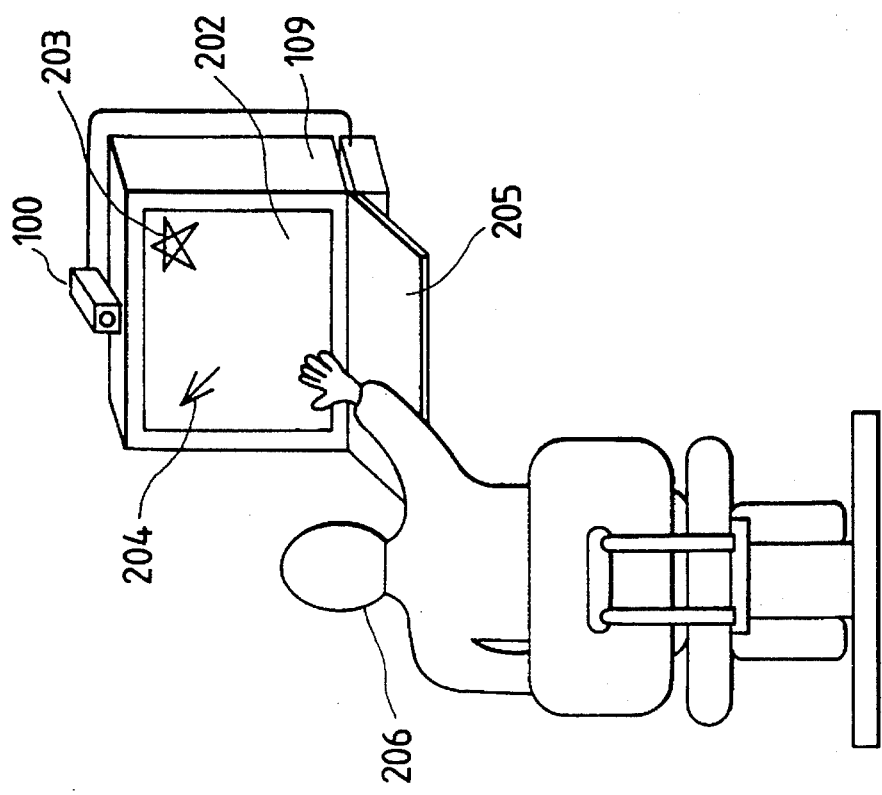
FIG. 2 is a diagrammatic view illustrating the component devices of the computer system of FIG. 1 and an operator's operating action.

Referring to FIG. 2, showing the arrangement of the video camera 100 and the computer apparatus 109 of the computer system, the computer apparatus 109 has a display device 202 and a keyboard 205. Displayed on the screen of the display device 202 are an icon 203 and a cursor 204. The video camera 100 is disposed in front of and is directed toward an operator 206 operating the computer apparatus 109.

An operation for clicking an icon with a conventional mouse will be described with reference to FIG. 3 prior to the description of a procedure for operating the computer apparatus 109, such as a PC or a WS, according to the present invention.

Figure 3:
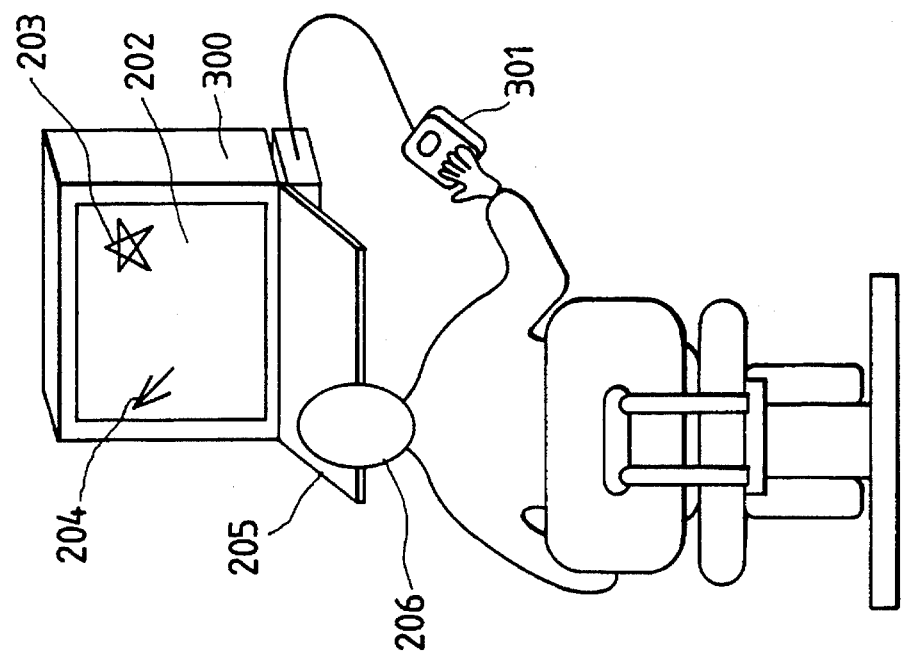
FIG. 3 is a diagrammatic view illustrating a clicking method in operating a conventional input system employing icons.

Referring to FIG. 3, a conventional computer apparatus 300 has a keyboard 205, a display device 202 and a mouse 301. An icon 203 and a cursor 204 are displayed on the screen of the display device 202. The cursor 204 must be moved to a position corresponding to the icon 203 to click on the icon 203. The operator 206 operates the mouse 301 by hand to move the mouse 301 on a flat surface, such as the top surface of the desk. The mouse 301 decomposes the displacement into a vertical displacement and a horizontal displacement, and supplies the vertical displacement and the horizontal displacement information to the computer apparatus 300. The cursor 204 moves according to the vertical displacement and the horizontal displacement information entered into the computer apparatus 300 by the mouse 301. After the cursor 204 has been located at the position corresponding to the icon 203, the operator pushes the click button of the mouse 301 to click on the icon 203.

A procedure for moving the cursor to a position corresponding to the icon and a subsequent procedure for clicking on the icon by the computer system of the present invention will be described hereinafter. As mentioned above, the vertical displacement and the horizontal displacement information must be given to the computer apparatus 109 to move the cursor 204 to the desired position. The present invention employs the video camera 100 as a means for giving the vertical displacement and the horizontal displacement information to the computer apparatus 109.

Referring again to FIG. 1, light travelling through the lens 101 and falling on the imaging device 102 is subjected to photoelectric conversion by the imaging device 102. Suppose that the video camera 100 is picking up the operator 206. Image signals obtained through the photoelectric conversion of light signals by the imaging device 102 are amplified by the amplifier 103, and then the amplified image signals are supplied to the A/D converter 104. Then, the A/D converter 104 converts the input analog image signals into corresponding digital image signals and supplies the digital image signals to the image signal processing circuit 105. The image signal processing circuit 105 processes the input digital image signals for gamma correction and the like to produce video signals. The video signal are supplied to the image extracting circuit 106. The image extracting circuit 106 extracts a portion of the video signals representing, for example, the hand of the operator 206 on the basis of preset data. An image extracting procedure carried out by the image extracting circuit 106 is described in "Study of Image Extraction by Sequential Growing Method", Terebijon Gakkai Nenji Taikai Koen Yoko-shu 1993, pp. 93–94. The preset data includes luminance data and color data, or shape data. In this case, the preset data represents the characteristics of the hand of human beings. The video camera 100 is provided with a reloadable storage means for storing the preset data.

Figure 4:
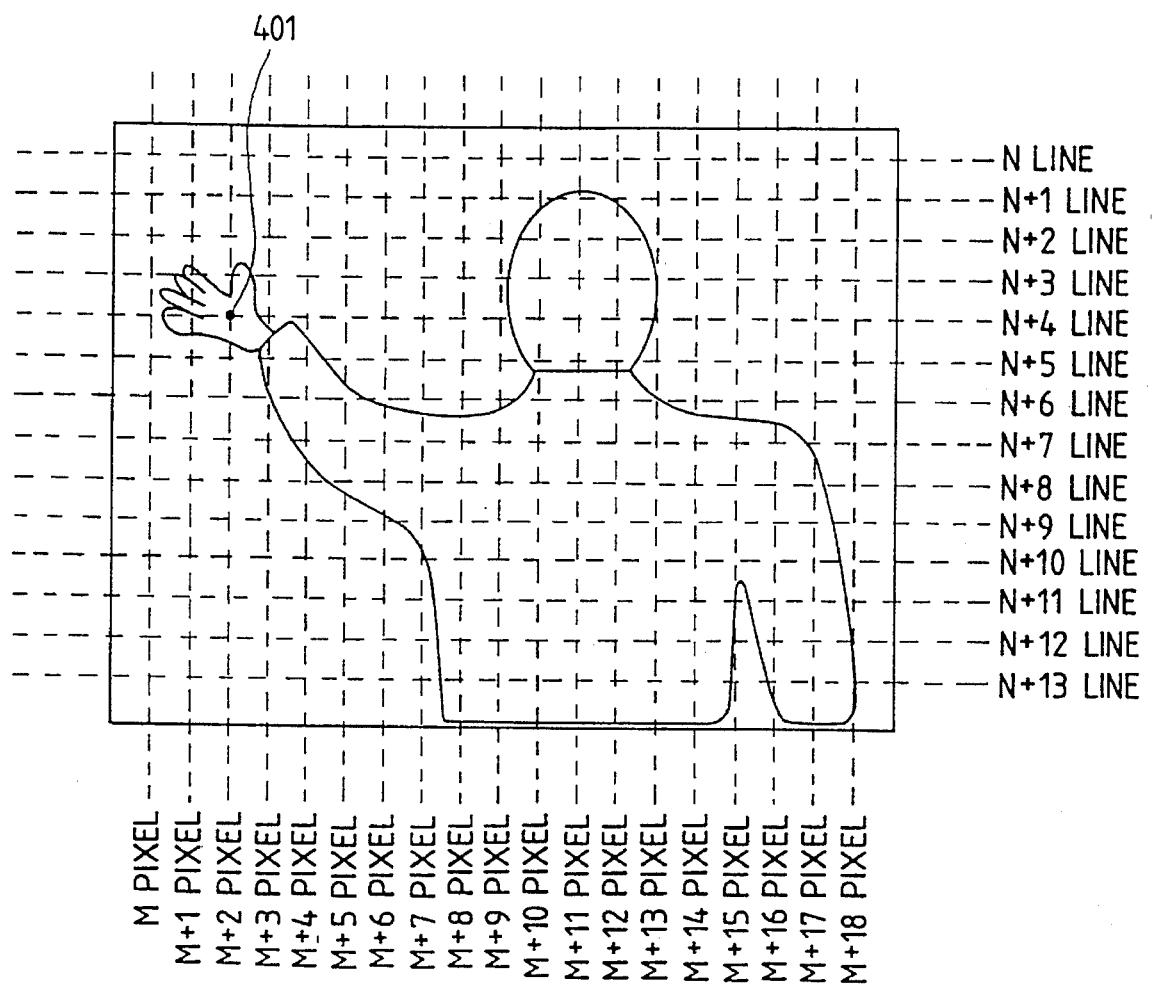
FIG. 4 is a diagrammatic view of a picture in an example formed by the computer system of FIG. 1.
Figure 5:
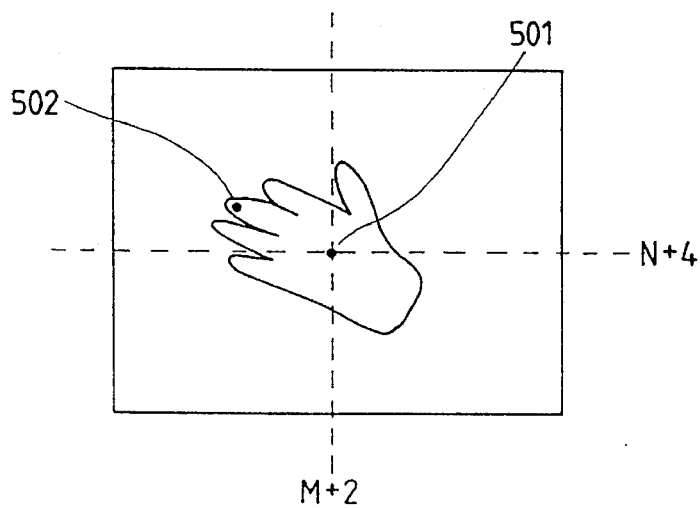
FIG. 5 is an enlarged view of a portion of the picture of FIG. 4.

In FIG. 4, showing a picture picked up by the video camera 100, a representative point as indicated at 401. In FIG. 5, showing an extracted image, i.e., an image of the hand of the operator 206, extracted from the image shown in FIG. 4 in an enlarged view, the centoroid of the extracted image is indicated at 501 and is a distal end of the extracted image is indicated at 502.

The image extracting circuit 106 determines the representative point 401 shown in FIG. 4 in the extracted image, i.e., the image of the open hand of the operator 206 shown in FIG. 5, and supplies the rectilinear coordinates of the representative point 401 to the microcomputer 107. The representative point 401 is an optional point in the extracted image, i.e., the image of the hand of the operator 206, such as the centroid 501 or the distal end 502. The vertical coordinate indicates the number from the top of a line on which the representative point 401 lies and the horizontal coordinate indicates the number from the left end of a pixel on which the representative point 401 lies. Suppose that the extracted image of the hand of the operator 206 is at the position shown in FIG. 4 and FIG. 5, and the representative point 401 is at the centroid 501 the vertical coordinate and the horizontal coordinate are N+4 and M+2, respectively. The width and the height of the screen may be divided by an optional number of vertical lines and an optional number of horizontal lines, and the vertical and the horizontal coordinate of the representative point 401 may be represented by those coordinates of a point at the intersection of one of the vertical lines and one of the horizontal lines, regardless of the number of the line and that of the pixel.

Referring again to FIG. 1, the image extracting circuit 106 sends the coordinates of the representative point 401 in the extracted image of the hand of the operator 206 to the microcomputer 107. Then, the computer 107 calculates the difference between the coordinates received in the preceding receiving cycle and those received in the present receiving cycle, which corresponds to a displacement of the representative point 401, converts the displacement into displacement signals of a signal format that can be recognized by the computer apparatus 109, i.e., a signal format of signals provided by the conventional mouse 301. If a mouse 301 is of a type that provides the coordinates of a point, the coordinates determined by the image extracting circuit 106 may be directly converted into signals of the aforesaid signal format. The microcomputer 107 has an I/O port, not shown. The microcomputer 107 sends the position data (data representing the displacement or the coordinates) of the same signal format as that of signals provided by a mouse 301 through signal line 108 connected to the I/O port. Then, the computer apparatus 109 moves the cursor 204 on the basis of the input position data to a desired position. Since the video camera 100 is disposed in front of the operator 206 and is directed toward the operator 206 as shown in FIG. 2, the cursor 204 is moved in a direction opposite to the direction of motion of the operator 206 with respect to transverse directions if the computer apparatus 109 moves the cursor 204 on the basis of the input position data corresponding to the output signals of the image extracting circuit 106. Therefore, the microcomputer 107 inverts the horizontal coordinate provided by the image extracting circuit 106 and gives the inverted horizontal coordinate to the computer apparatus 109. On the other hand, the horizontal coordinate may be inverted by the computer apparatus 109.

Referring to FIG. 2, after the cursor 204 has been moved to a position corresponding to the desired icon 203, the operator 206 will press a key, which has the function of the click button of a mouse, on the keyboard 205 to instruct the computer apparatus 109 to select the icon 203. The clicking may be executed by the video camera 100 when the video camera picks up a specified image, such as the operator's fist. In such a case, the microcomputer 107 gives a click signal to the computer apparatus 109 when the video camera 100 picks up the operator's fist after the cursor 204 has been moved to the position corresponding to the icon 203.

As shown in FIG. 1, since the image signal processing circuit 105 of the video camera 100 gives digital video signals to the computer apparatus 109, the video camera 100 can be used as one of the image data sources of the computer apparatus.

The computer system illustrated in FIGS. 1 to 5 enables the operator to give instructions directly to the computer apparatus without using any input device, such as a mouse.

A computer system forming a second embodiment according to the present invention will be described hereinafter with reference to FIG. 6, in which parts like or corresponding to those shown in FIG. 1 are designated by the same reference characters and the description thereof will be omitted to avoid duplication. The operations of the image extracting circuit 601 and the microcomputer 602 of the computer system shown in FIG. 6 are different from those of the image extracting circuit 106 and the microcomputer 107 of the computer system shown in FIG. 1. An image of an object 603 can be picked up by a video camera 600 and can be extracted by the image extracting circuit 601.

Figure 7:
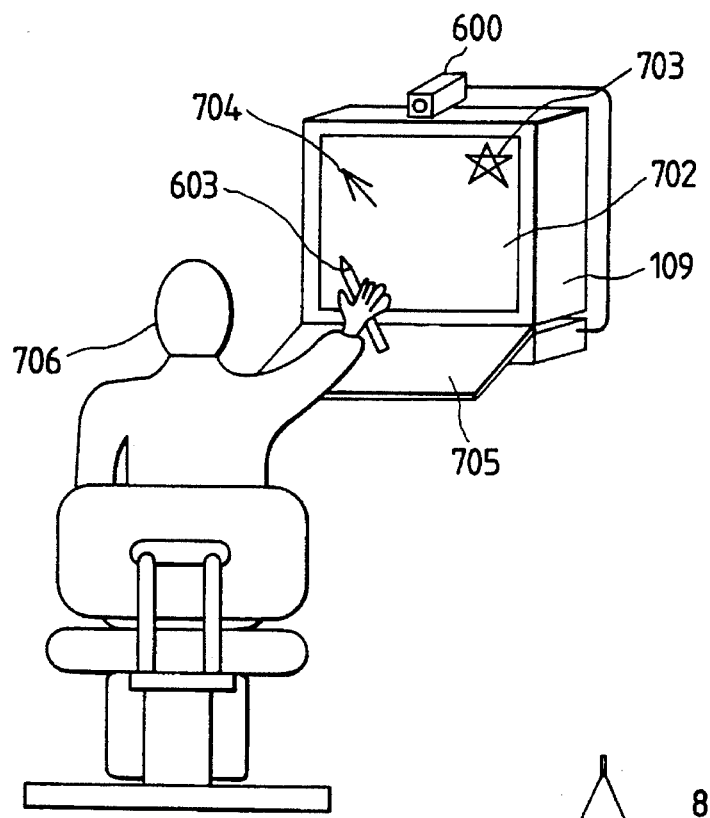
FIG. 7 is a diagrammatic view illustrating the component devices of the computer system of FIG. 6 and an operator's operating action.

Referring to FIG. 7 showing an arrangement of the video camera 600 and a computer apparatus 109 connected to the video camera 600 for practical operation, the computer apparatus 109 has a display device 702 and a keyboard 705, an icon 703 and a cursor 704 are displayed on the screen of the display device 702, and the video camera 600 is disposed in front of and directed toward an operator 706 who operates the computer apparatus 109.

Figure 8:
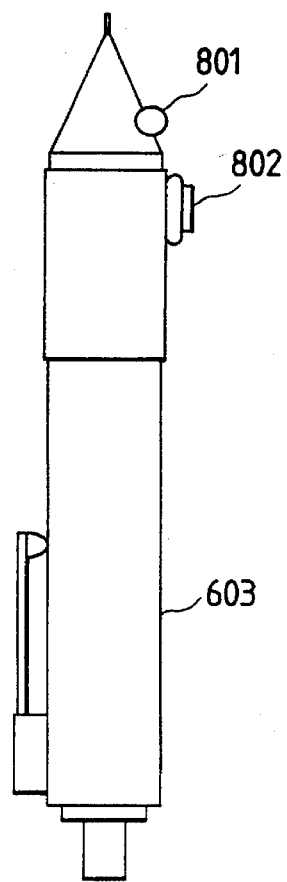
FIG. 8 is a front view of an example of an extracted subject.

FIG. 8 is an example of the object 603. The object 603 can be a pencil or a pen and is provided with a light emitting-element 801 and a switch 802 for turning on and off the light emitting-element 801. The operator 706 holds the object 603 as shown in FIG. 7 so as to be viewed by the video camera 600 and operates the object 603.

An operation for moving the cursor 704 to a position corresponding to the icon 702 and a subsequent operation for clicking on the icon 703 to be carried out by the computer system shown in FIG. 6 will be described hereinafter.

FIG. 9(a) shows an image of a scene shown in FIG. 7 picked up by the video camera 600 and displayed on the screen of the display 702. In FIG. 9(a) a representative point is indicated at 901. FIG. 9(b) is an enlarged view of an extracted image of the object 603 extracted from the image shown in FIG. 9(a).

Referring again to FIG. 6, the image extracting circuit 601 specifies the representative point 901 in the extracted image of the object 603 and gives the rectilinear coordinates of the representative point 901. The representative point 901 is the tip of the extracted image of the object 603. The significance of the rectilinear coordinates, i.e., the vertical coordinate and the horizontal coordinate, is the same as that of the rectilinear coordinates dealt with by the computer system shown in FIG. 1. The microcomputer 601 calculates the difference between the coordinates received in the preceding receiving cycle and those received in the present receiving cycle, i.e., determines a displacement of the representative point 901, and converts the displacement into displacement signals of a signal format that can be recognized by the computer apparatus 109, i.e., a signal format of signals provided by a conventional mouse. As mentioned above, the microcomputer 602 may convert the coordinates provided by the image extracting circuit 601 directly into displacement signals of the required signal format as if a mouse were providing the coordinates representing the representative point. The microcomputer 602 has an I/O port, not shown. The microcomputer 602 sends the position data (data on the displacement or the coordinates) of the same signal format as that of the signals provided by a mouse through a signal line 108 connected to the I/O port. Then, the computer apparatus 109 moves the cursor 704 on the basis of the input position data to a desired position. Incidentally, since the video camera 600 is disposed in front of the operator and is directed toward the operator 706, as shown in FIG. 7, the direction of movement of the cursor 704 with respect to transverse directions is opposite to the direction of motion of the operator 706 if the computer apparatus 109 moves the cursor 704 on the basis of the input position data corresponding to the output signals of the image extracting circuit 106. Therefore, the microcomputer 602 of this computer system inverts the horizontal coordinate among the coordinates provided by the image extracting circuit 601, and gives the inverted horizontal coordinate information to the computer apparatus 109. On the other hand, the horizontal coordinate information may be inverted by the computer apparatus 109.

Referring to FIG. 7, a clicking operation is performed to instruct the computer apparatus 109 to select the icon 703 after the cursor 704 has been moved to the position corresponding to the icon 703. The image extracting circuit 601 has a function to sense the light emitted by the light-emitting element 801 of the object 603 in addition to the function to extract the image of the object 603 and to calculate the position of the extracted image of the object 603 on the screen. The image extracting circuit 601 provides position data indicating the position of the image of the object on the screen, and gives a light detection signal, i.e., a click signal, when an image of the light emitted by the light-emitting element 801 is displayed on the screen. The microcomputer 602 converts the signal format of the light detection signal into a signal format that can be dealt with by the computer apparatus 109, i.e., a same signal format as that of the output signal of a mouse 301 provided when the click button of the mouse 301 is pressed. The microcomputer 602 sends the click signal through the signal line 108 connected to the I/O port thereof to the computer apparatus 109.

The video camera 600 of the computer system shown in FIG. 6, similarly to that of the computer system shown in FIG. 1, gives digital video signals to the computer apparatus 109 and hence can be used also as one of common image data supply sources for the computer apparatus.

The computer system illustrated in FIGS. 6 to 9, like the computer system illustrated in FIGS. 1 to 5, enables the operator to enter instructions directly to the computer apparatus without using any input device, such as a mouse.

A computer system forming a third embodiment according to the present invention will be described hereinafter. This computer system includes a computer game machine as a computer apparatus and is used for moving characters of a game.

The computer system in the third embodiment is shown in FIG. 10, in which parts like or corresponding to those shown in FIG. 1 are designated by the same reference characters and the description thereof will be omitted to avoid duplication. Referring to FIG. 10, the actions of an image extracting circuit 1003 and a microcomputer 1004 are different from those of the image extracting circuit 106 and the microcomputer 107 of the computer system shown in FIG. 1. A computer game machine 1002 is connected to the video camera 1000.

FIG. 11 shows the arrangement of the video camera 1000 and the computer game machine 1002 connected to the video camera 1000 for practical operation. As shown in FIG. 11, the video camera 1000 that picks up an image of an operator 1001, and a television receiver 1104 are connected to the computer game machine 1002. A character 1103 of a game is displayed on the screen 1102 of the television receiver 1104.

The operation of a conventional computer game machine will be described prior to the description of the computer system in the third embodiment. Referring to FIG. 12 showing a controller 1200 for operating a conventional computer game machine by way of example, the controller 1200 has a direction selector button 1201 and a button A 1202 and a button B 1203. When operating the computer game machine, the operator operates the controller 1200 to control a character. For example, the operator pushes the button A 1202 of the controller 1200 to make the character perform a punching action; that is, the operator makes the computer game machine 1002 recognize the intention of the operator to punch. Whoever operates the button A 1202, the action of the character is the same. Therefore, the operator's skill in playing the game is dependent on the timing of pushing the button A 1202.

Operations of the computer system including the computer game machine for making the character perform punching will be described hereinafter.

Referring to FIG. 13 showing an image picked up by the video camera 1000 and displayed on the screen, a head's image 1301, a hand's image 1302 and a foot's image 1303 of the operator 1001 are displayed, and a head detecting area 1304, a hand detecting area 1305 and a foot detecting area 1306 are defined on the screen. The image extracting circuit 1003 extracts the head's image 1301, the hand's image 1302 and the foot's image 1303 from the image shown in FIG. 13, sets representative points respectively at the extremities of the extracted images 1301, 1302 and 1303, and gives sets of coordinates of the representative points on the screen to the microcomputer 1004. The microcomputer 1004 examines the coordinates to see if the representative point of the hand's image 1302 is within the hand detecting area 1305. If the representative point of the hand's image 1302 is outside the hand detecting area 1305, it is decided that the hand of the character 1103 is lowered to an initial position. When the representative point of the hand's image 1302 is moved into the hand detecting area 1305, namely, similar to when the operator 1001 pushes the button A 1202 for a punching action, the microcomputer 1004 converts the signal format of a punch signal into a signal format like that of a signal provided by the conventional controller, and gives the punch signal to the computer game machine 1002. Then, the computer game machine 1002 controls the character 1103 for punching action on the basis of the input signal. The character 1103 can be controlled by control methods similar to the foregoing control method for a kicking action, a jumping action and a crouching action.

When operating the computer system, i.e., the computer game system, illustrated in FIGS. 10 to 13, the operator moves the body actually to control the actions of the character 1103. Therefore, the operator is able to enjoy playing the computer game machine with a greater reality.

We claim:

1. A computer system for carrying out control operations according to operator's actions, said computer system comprising:

an imaging device for picking up an image of a subject and generating an image signal representing the image of the subject;

an image extracting circuit for extracting a plurality of areas meeting given conditions from the image represented by the image signal provided by the imaging device, and providing position data representing the positions of the extracted areas;

a position examining means for determining whether or not the positions of the extracted areas represented by the position data are within a plurality of predetermined detection areas, respectively; and a computer apparatus for carrying out a plurality of control operations specified by the detection areas on the basis of a plurality of results of the determinations corresponding to each predetermined detection area made by the position examining means.

2. A computer system according to claim 1, further comprising a display for displaying images represented by input signals given thereto, wherein the computer apparatus supplies a signal representing a character to the display to instruct the display to display an image of the character, and controls the display according to results of examination made by the position examining means to move a plurality of portions of a image of the character.

3. A video camera comprising:

an imaging device for picking up an image of a subject and generating an image signal representing the image of the subject;

an image extracting circuit for extracting a plurality of areas meeting given conditions from the image signal provided by the imaging device, and providing position data representing positions of extracted areas;

a position examining means for determining whether or not the positions of the extracted areas represented by the position data are within a plurality of predetermined areas, respectively; and a communication means for sending out operation signals indicating each determination corresponding to each predetermined area made by the position examining means.

4. A video camera according to claim 3, wherein the areas extracted by the image extracting circuit are particular portions of an operator's body.

* * * * *